(12) United States Patent
Sierra

(10) Patent No.: US 10,995,793 B1
(45) Date of Patent: May 4, 2021

(54) BOOT NEEDLE ROLLER BEARING

(71) Applicant: Schaeffler Technologies AG & Co. KG, Herzogenaurach (DE)

(72) Inventor: Kleberson Sierra, Sorocaba (BR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/720,941

(22) Filed: Dec. 19, 2019

(51) Int. Cl.
  *F16C 19/44* (2006.01)
  *F16C 19/36* (2006.01)
  *F16C 33/58* (2006.01)
  *F16C 43/08* (2006.01)

(52) U.S. Cl.
  CPC ............ *F16C 19/44* (2013.01); *F16C 19/361* (2013.01); *F16C 33/586* (2013.01); *F16C 43/086* (2013.01)

(58) Field of Classification Search
  CPC .......... F16C 19/22; F16C 19/24; F16C 19/26; F16C 19/444; F16C 19/46; F16C 19/463; F16C 19/466; F16C 33/583; F16C 33/586; F16C 33/588; F16C 33/80; F16C 33/805; F16C 2361/00; F16C 2361/31; F16C 19/361
  See application file for complete search history.

(56) References Cited

U.S. PATENT DOCUMENTS

| | | | | |
|---|---|---|---|---|
| 4,869,604 A | * | 9/1989 | Hill | F16C 19/26 384/569 |
| 4,955,732 A | * | 9/1990 | Behrens | F16C 19/46 384/484 |
| 5,458,421 A | * | 10/1995 | Giese | F16C 19/46 384/467 |
| 2001/0006566 A1 | * | 7/2001 | Akamatsu | F16C 19/46 384/559 |

FOREIGN PATENT DOCUMENTS

DE  4230965  * 9/1992

OTHER PUBLICATIONS

Translation of DE4230965 obtained Oct. 7, 2020.*

* cited by examiner

*Primary Examiner* — James Pilkington
(74) *Attorney, Agent, or Firm* — Antun M. Peakovic

(57) ABSTRACT

A boot needle roller bearing is designed to reduce friction between a flexible boot non-rotatably attached to a differential housing and a rotatable half-shaft. A plurality of rollers is retained axially between a first lip formed in the outer ring and a set of protrusions that are formed after installation of the rollers by bending prongs inwardly. The inner ring is retained axially between the protrusions and a second lip formed into the outer ring after installation of the inner ring.

12 Claims, 3 Drawing Sheets

BOOT NEEDLE ROLLER BEARING

TECHNICAL FIELD

The disclosure relates to the field of needle roller bearings. More particularly, the disclosure related to a needle roller bearing fixed to a half-shaft boot of an automotive axle assembly.

BACKGROUND

FIG. 1 illustrates a portion of a front wheel drive transmission, including a differential. The differential gearing is enclosed in a housing 10. The differential gearing divides the power between two half-shafts. One of the half-shafts 12 is shown in FIG. 1 while the other is not. Half-shaft 12 is joined to the differential gearing by a universal joint, specifically a constant velocity joint 14, such that the axis of rotation of the half-shaft can differ slightly from the axis of rotation of the differential side gear. A flexible boot 16 seals an opening of the housing 10 through which half-shaft 12 extends. The boot does not rotate with respect to the housing. One end of boot 16 is fixed to the housing. The other end of the boot is joined to the half-shaft 12 via a bearing 18.

SUMMARY

A bearing includes an inner ring, an outer ring, and a plurality of needle rollers. The inner ring has a first radially outwardly extending lip. The plurality of needle rollers are arranged to roll against an outer surface of the inner ring and an inner surface of the outer ring. The outer ring has a first radially inwardly extending lip on a first side of the rollers, a second radially inwardly extending lip extending beyond the first radially outwardly extending lip, and a plurality of protrusion extending radially inwardly between a second side of the rollers and the first radially outwardly extending lip. The protrusions may be formed by bending segments of the outer ring inward. The bearing may also include an inner sleeve radially inside the inner ring and having a second radially outwardly extending lip extending between the first radially outwardly extending lip and the second radially inwardly extending lip. The bearing may also include a cage retaining the plurality of needle rollers. The bearing may also include a boot seal rotationally fixed to the outer ring and slidingly contacting the inner ring.

A bearing includes a first ring, a second ring, and a plurality of needle rollers. The first ring has a first lip. The second ring has a second lip, a third lip, and a plurality of protrusions. The plurality of needle rollers is arranged to roll between the first ring and the second ring. The first lip extends radially between the protrusions and the second lip on a first axial end of the rollers. The protrusions may be formed by bending segments of the second ring. The third lip extends radially on a second axial end of the rollers. The bearing may also include a cage retaining the plurality of needle rollers.

A method of assembling a bearing includes providing an inner ring and an outer ring, inserting a plurality of rollers radially between the inner ring and the outer ring, bending prongs of the outer ring radially inward, and bending a free end of the outer ring inward. The an inner ring has a first outwardly extending lip. The outer ring has a first inwardly extending lip and a plurality of U-shaped cuts that define the prongs. The rollers are inserted axially between the first inwardly extending lip and the first outwardly extending lip. The prongs are bent such that they extend between the rollers and the first outwardly extending lip, thereby axially retaining the rollers with respect to the outer ring. The free end of the outer ring is bent to form a second inwardly extending lip such that the first outwardly extending lip extends between the prongs and the second inwardly extending lip, thereby axially retaining the inner ring with respect to the outer ring. The method may also include inserting a sleeve radially inside the inner ring prior to bending the free end of the outer ring. The sleeve may have a second outwardly extending lip extending between the first outwardly extending lip and the second inwardly extending lip. A boot seal may be attached to the outer ring in sliding contact with the inner ring. The outer ring may be formed by drawing strip material to form the first inwardly extending lip and punching the U-shaped cuts.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
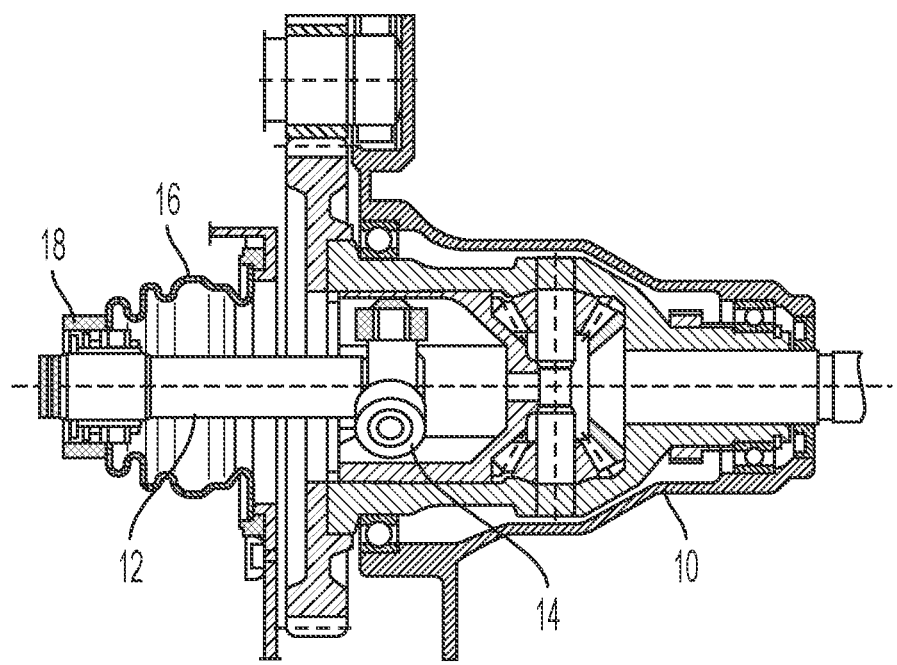
FIG. 1 is a cross section of a typical automotive differential.
Figure 2:
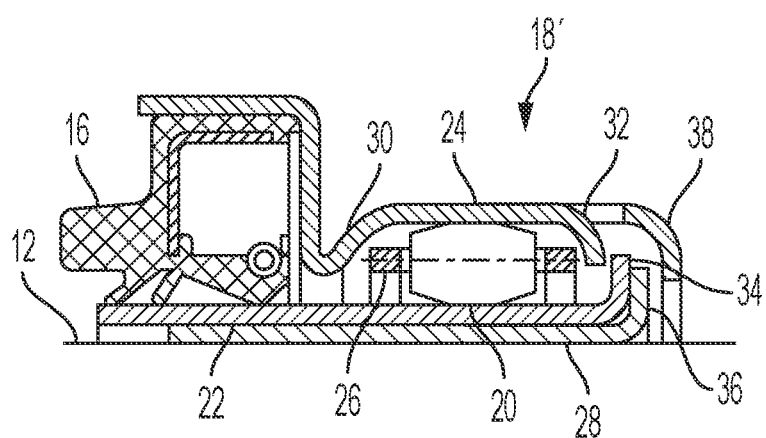
FIG. 2 is a cross section of a boot needle roller bearing suitable for use in the differential of FIG. 1

FIG. 2 is a cross section of a boot bearing 18' suitable for use in the transmission assembly of FIG. 1 or other applications having a non-rotating flexible boot and a rotating shaft. Rollers 20 are disposed between inner ring 22 and outer ring 24. Cage 26 positions the rollers circumferentially with respect to one another. Sleeve 28 is positioned radially between shaft 12 and inner ring 22. The bearing 18' may be used with shafts of varying diameter by employing sleeves of varying thickness. For example, for a smaller shaft, a thicker sleeve 28 with a smaller inside diameter but the same outer diameter is used.

Rollers 20 are retained axially between a central lip 30 of outer ring 24 and a set of protrusions 32 extending inwardly from outer ring 24. The manner of forming these protrusions is discussed in more detail below. Inner ring 22 has an outwardly extending lip 34. Similarly, sleeve 28 has an outwardly extending lip 36. These lips are positioned axially between the protrusions 32 and an inwardly extending end lip 38 of the outer ring, thereby axially retaining the inner ring and sleeve with respect to the outer sleeve.

Boot 16 is fastened to outer ring 24 on the opposite side of central lip 30 from the rollers. Boot 16 slidingly engages inner ring 22 forming a seal. Alternatively, boot 16 could form the seal by slidingly engaging sleeve 28 or directly slidingly engaging shaft 12.

Figure 3:
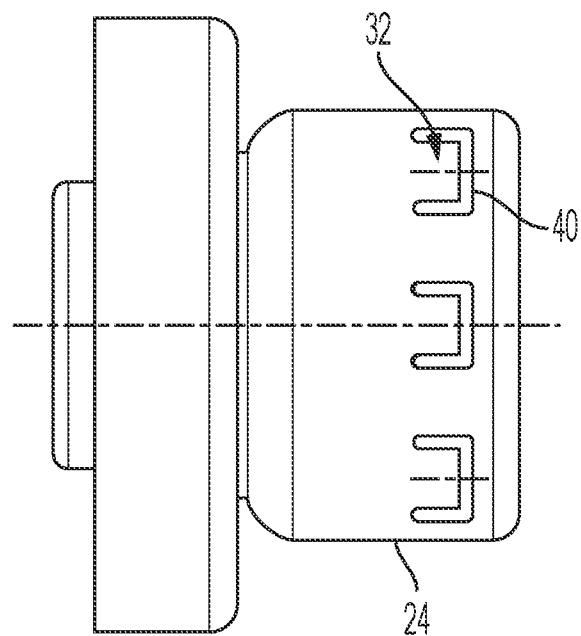
FIG. 3 is a side view of an outer ring of the boot needle roller bearing of FIG. 2.
Figure 4:
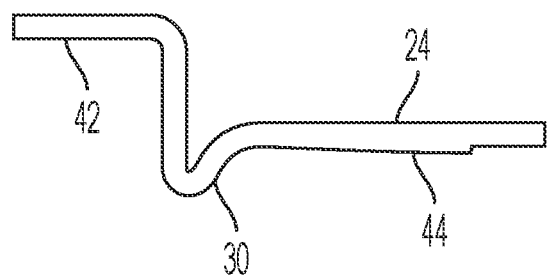
FIG. 4 is a cross section of the outer ring of the boot needle roller bearing of FIG. 2 at a stage of fabrication.

FIG. 3 is a side view of outer ring 24. At several points around the circumference, U-shaped cuts 40 create prongs which are then bent inwardly to form the protrusions 32. FIG. 4 shows a cross-section of the outer ring 24 prior to assembly of the bearing. A drawing process forms the central lip 30 and the boot retaining portion 42. The section 44 opposite the boot retaining portion is cylindrical at this stage of assembly. After the outer ring is drawn, the U-shaped cuts 40 are created by stamping. The protrusions 32 are formed after the cage and rollers are installed. The end lip 38 is formed after the inner ring 22 and the sleeve 28 are installed.

Figure 5:
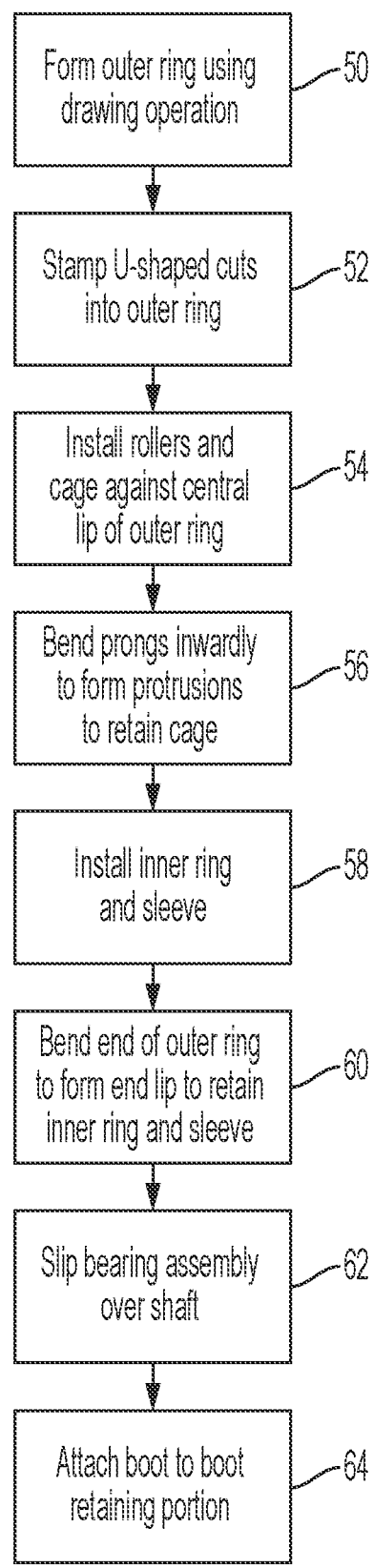
FIG. 5 is a flow chart for a process of fabricating and assembling the boot needle roller bearing of FIG. 2.

FIG. 5 is a flowchart for a process of fabricating and assembling boot bearing 18' of FIG. 2. At 50, the outer ring is formed using, for example, a drawing operation. At 52, U-shaped cuts are stamped into the outer ring to form prongs. At 54, the rollers and cage is installed to the outer ring. At 56, the prongs that were formed at 52 are bend inwardly forming protrusions which retain the cage and rollers. At 58, the inner ring and sleeve are installed with respect to the outer ring and rollers. At 60, the end of the outer ring is bent inwardly forming a lip which retains the inner ring and the sleeve. At 62, the inner ring, sleeve, outer ring, rollers, and cage are slipped over the shaft. Finally, at 64, the boot is attached to the boot retaining portion of the outer ring.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A bearing comprising:
    an inner ring having a first radially outwardly extending lip;
    a plurality of needle rollers arranged to roll against an outer surface of the inner ring;
    an outer ring having an inner surface against which the needle rollers roll, a first radially inwardly extending lip on a first side of the rollers, a second radially inwardly extending lip extending beyond the first radially outwardly extending lip, and a plurality of protrusion extending radially inwardly between a second side of the rollers and the first radially outwardly extending lip.

2. The bearing of claim 1 further comprising an inner sleeve radially inside the inner ring and having a second radially outwardly extending lip extending between the first radially outwardly extending lip and the second radially inwardly extending lip.

3. The bearing of claim 1 further comprising a cage retaining the plurality of needle rollers.

4. The bearing of claim 1 further comprising a boot seal rotationally fixed to the outer ring and slidingly contacting the inner ring.

5. The bearing of claim 1 wherein the protrusions are formed by bending segments of the outer ring inward.

6. A bearing comprising:
    a first ring having a first lip;
    a second ring having a second lip, a third lip, and a plurality of protrusions; and
    a plurality of needle rollers arranged to roll between the first ring and the second ring; and wherein
    the first lip extends radially between the protrusions and the second lip on a first axial end of the rollers and the third lip extends radially on a second axial end of the rollers.

7. The bearing of claim 6 further comprising a cage retaining the plurality of needle rollers.

8. The bearing of claim 6 wherein the protrusions are formed by bending segments of the second ring.

9. A method of assembling a bearing comprising:
    providing an inner ring having a first outwardly extending lip;
    providing an outer ring having a first inwardly extending lip and having a plurality of U-shaped cuts such that each U-shaped cut defines a corresponding prong;
    inserting a plurality of rollers into a cage;
    inserting the cage axially into the outer ring against the inwardly extending lip of the outer ring;
    bending the prongs radially inward such that the rollers and the cage are axially retained between the first inwardly extending lip and the prongs;
    inserting the inner ring axially and radially inwardly with respect to the cage and the rollers; and
    bending a free end of the outer ring to form a second inwardly extending lip such that the first outwardly extending lip extends between the prongs and the second inwardly extending lip, thereby axially retaining the inner ring with respect to the outer ring.

10. The method of claim 9 further comprising:
    inserting a sleeve radially inside the inner ring prior to bending the free end of the outer ring, the sleeve having a second outwardly extending lip extending between the first outwardly extending lip and the second inwardly extending lip.

11. The method of claim 9 further comprising:
attaching a boot seal to the outer ring, the boot seal arranged to slidingly contact the inner ring.

12. The method of claim 9 wherein providing the outer ring comprises:
drawing strip material to form the first inwardly extending lip; and
punching the U-shaped cuts.

* * * * *